Patented July 10, 1951

2,559,580

UNITED STATES PATENT OFFICE 2,559,580

STABILIZATION OF AQUEOUS AMINE SOLUTIONS AGAINST OXIDATION AND CORROSION IN GAS SEPARATION PROCESSES

Bruce T. Alexander, Louisville, Ky., assignor to The Girdler Corporation, Louisville, Ky., a corporation of Delaware No Drawing. Application January 30, 1947, Serial No. 725,278

9 Claims. (Cl. 23—2)

This invention relates to processes in which fluid mixtures are separated by reacting them with amine solutions. It aims primarily to improve such processes by selectively stabilizing the amine solution, that is, by reducing its tendency to enter into undesired side reactions, without impairing its efficacy as respects the desired reaction. The invention includes the discovery that certain ions will exert such a stabilizing effect on amine solutions, particularly the iodine ion. Combinations of certain ions may also be used.

Fluid separation processes using amine solution cycles are at this time well known to the art. Their common characteristic is the repeated "contamination" and "purification" of an aqueous amine solution. In one familiar process $CO_2$ is separated from flue gases by bubbling these gases through an aqueous solution of monoethanolamine. The $CO_2$ reacts with the amine solution, and the reacted or "contaminated" solution is then steam-distilled to drive off the $CO_2$ (the desired product). The solution, now "purified"—i. e., freed of $CO_2$—is returned to the cycle to treat fresh quantities of flue gas.

Effective and economical though such processes are, it has been found that they are susceptible of improvement in some respects. One difficulty is the gradual increase of constituents which do not yield to steam distillation, or to whatever other technique may be employed in a particular plant to regenerate the amine solution. Among such unwanted constituents may be mentioned those products, resulting from gradual oxidation of the amine solution, which are not readily salvaged or removed by the regenerating treatment applied, and which tend to build up in the solution. These represent an increasing burden, physically and chemically, since they do no useful work in the cycle; their bulk displaces agents which might be useful; and it requires power to heat and circulate them through the apparatus. Still further they represent a loss, through reaction, of relatively expensive amine constituents.

The presence of oxidation products in the amine solution not only involves these passive disadvantages; it sometimes also entails active harm. This results when the oxidation products themselves, or by-products of their presence, are not only stable as against the regenerating step, but are also corrosive to the apparatus in which the process is performed.

A primary object of the present invention is to prevent or inhibit oxidation of amine solutions used in cyclic processes for separating fluid mixtures. A further object is to reduce or eliminate corrosion of apparatus, and especially such corrosion as may be traceable to the presence of oxidation products in the amine treating solutions employed.

It has long been realized that a stabilizing agent which would prevent deterioration of amine solutions would be a very desirable addition to such solutions. Unfortunately, there seem to be very few chemicals which have this property and which will also remain in the amine cycle. That is to say, a suitable agent should be soluble to at least some extent in aqueous amine solutions; and it must itself be substantially resistant, at all points of the cycle, to undesired reaction, so that it will not be lost or destroyed, either by decomposition or synthesis. For instance, it must be an agent which will not precipitate, even in the presence of random impurities which may be introduced into the cycle from the fluid mixtures treated. In short, the qualifications which a suitable stabilizing agent must possess are both numerous and difficult to meet.

It has been discovered that oxidation of an aqueous amine solution can be reduced by incorporating in it minor amounts of a material which will ensure the presence, under the conditions of the primary process, of iodine ions, this term being used herein to refer to any ion containing iodine. Many different amines and many different compounds of iodine have been tested. Any compound which ionizes to form iodine ions in the amine solution under the conditions of the dominant (fluid-separating) process, seems to be effective. At least none has been tested which failed to effect a reduction in oxidation. Iodine itself will, of course, supply the desired ion in such solutions.

However, for the sake of convenience, potassium iodide has been selected in demonstrating the general efficacy of the discovery by means of parallel experiments tabulated in Table I, below.

In each of these tests, 1000 liters of a gaseous mixture containing 50% $O_2$ and 50% $CO_2$ were brought into intimate contact, at a rate of 100 cc. per minute, with 100 ml. of the aqueous amine solution to be tested, at 80° C. The quantity of amine oxidized was computed from measurements of the amount of ammonia evolved and reduction in alkalinity of the amine solution. The amine solutions tested, and the molar concentration of each, are listed on the left. The first column, marked "Blank" shows the percent of oxidation which took place in an aqueous amine solution to which no iodine compound had been added. The effect of adding stated proportions of potassium iodide to aqueous solutions of four different amines is shown in the succeeding columns. In each instance, the column marked (a) shows the percent of amine oxidized and the column marked (b) indicates the reduction in the rate of oxidation. The latter expresses the percent reduction of the value in the "Blank" column, where no stabilizing agent was added.

*Table I*

OXIDATION OF AQUEOUS AMINE SOLUTIONS

| Amine Used | Molarity of Solution | Blank | 0.25% KI | | 0.5% KI | | 1.0% KI | |
|---|---|---|---|---|---|---|---|---|
| | | (a) | (a) | (b) | (a) | (b) | (a) | (b) |
| Monoethanolamine | 3 | 11.3 | (¹) | (¹) | 0.4 | 96.5 | 0.5 | 95.6 |
| Diethanolamine | 3 | 71.6 | 33.6 | 53.0 | 21.0 | 70.6 | 6.5 | 90.0 |
| Monoisopropanolamine | 3 | 50.8 | 3.3 | 93.6 | 3.1 | 93.8 | 2.3 | 95.4 |
| Diaminoisopropanol | 1.5 | 63.0 | 58.2 | 7.5 | 52.6 | 16.4 | 46.9 | 25.4 |

¹ See Table II.

From this table it will be apparent that the addition of small proportions of potassium iodide effects a rather marked reduction in the proportion of amine solution which will be lost under oxidizing conditions. It should be mentioned that the first three amine solutions listed were all three-molar solutions. The fourth one, diaminoisopropanol, was only half as concentrated, i. e. 1.5 molar.

In Table I, above, the proportion of treating agent to solution varies from 0.25% to 1.0%. Much smaller concentrations are often highly effective, as is shown by Table II, below, where results with amounts of potassium iodide as small as .001% are given. These runs were all made with monoethanolamine. Even with concentrations as dilute as are reported in this table, the reduction in rate of oxidation is impressive. Indeed, with monoethanolamine the efficacy of potassium iodide at concentrations of 0.1% is so great that this ratio is regarded as representing the preferred embodiment of the invention, considered from an economic point of view.

*Table II*

EFFECT ON OXIDATION OF A 3-MOLAR AQUEOUS SOLUTION OF MONOETHANOLAMINE UPON ADDITION OF MINOR PROPORTIONS OF POTASSIUM IODIDE

| Per Cent Potassium Iodide Added | Per Cent Amine Solution Oxidized | Per Cent Reduction in Rate of Oxidation |
|---|---|---|
| None | 11.3 | 0.0 |
| 0.001 | 11.2 | 0.9 |
| 0.01 | 5.8 | 48.7 |
| 0.05 | 4.1 | 63.7 |
| 0.1 | 0.7 | 93.8 |
| 0.5 | 0.4 | 96.5 |
| 1.0 | 0.5 | 95.6 |

From this last series of tests, it can be seen that extremely effective results in reducing the rate of oxidation of monoethanolamine are obtained with concentrations of reagent in the neighborhood of 1.0% or slightly below. It will be noted, however, that results almost as good can be obtained by using only one tenth as much of the reagent—that is, 0.1%. That is to say, a concentration of 0.1% of reagent gave the greatest reduction in amount of amine oxidized per unit of reagent actually employed.

It is, of course, apparent that the amount of stabilizing agent used may exceed 1.0%, but the gain in reduced oxidation may be inadequate to justify the expense.

Among the materials which will provide iodine ions in the process, may be mentioned the alkali metal salts of iodine, particularly those of sodium and potassium and also ammonium, which latter, for the purposes of this case, may be regarded as an alkali metal. Alkaline earth metal salts of iodine are also effective.

As a matter of fact, any compound of iodine which is capable of providing iodine ions in an aqueous amine solution seems to be effective. It is not essential that a salt be employed. Hydroiodic acid or anhydrides of the iodic acids may be used. Organic iodine compounds also are effective. Needless to say, since the efficacy of the process seems to bear a relation to the release of iodine ions, it is necessary that the material be, to at least some extent, soluble in the amine solution.

The proportion of iodine in the iodine-providing constituent seems to be important. Materials in which iodine predominates generally give better results than compounds which contain disproportionately little iodine. This is well illustrated by comparing hexyl iodide, in the table below, and iodoform. Under identical conditions, the former effected a reduction of approximately 20% in the rate of oxidation, whereas the reduction effected by the latter was over 98%. This difference is attributed at least in part to the fact that the iodoform molecule contains a much greater proportion of iodine than does a molecule of hexyl iodide.

In order to give an indication of the variety of iodine compounds which may be employed, and of the range of effectiveness, several such compounds are listed below in Table III. At the head of the list will be found the result when no iodine-containing material was added to the solution. In all other instances the amount added was 0.1%, and the efficacy of the particular compound is evaluated by showing, first, the percent of solution oxidized and, second, the ratio, in percentage, which this reduction bears to the control.

*Table III*

EFFECT ON OXIDATION OF ADDING 0.1% OF VARIOUS IODINE COMPOUNDS TO A 3-MOLAR AQUEOUS SOLUTION OF MONOETHANOLAMINE

| Compound Added | Per Cent MEA Oxidized | Per Cent Reduction in Rate of Oxidation |
|---|---|---|
| None | 10.4 | 0 |
| Barium Iodide | 0.7 | 93.3 |
| Calcium Iodide | 0.9 | 91.3 |
| Cuprous Iodide | 1.8 | 82.7 |
| Magnesium Iodide | 0.8 | 92.3 |
| Potassium Iodate | 2.1 | 79.8 |
| Potassium Iodide | 0.7 | 93.3 |
| Hexyl Iodide | 8.33 | 19.9 |
| n-Amyl Iodide | 7.01 | 31.7 |
| Cetyl Iodide | 7.13 | 31.4 |
| Triiodo Benzoic Acid | 0.40 | 96.2 |
| Tert. Butyl Iodide | 0.33 | 96.8 |
| Iodoform | 0.19 | 98.2 |

As has been stated above, the primary purpose of the present invention is to reduce the tendency of the amine solutions to enter into undesired reactions, without impairing the efficacy of such solutions as respects the desired reaction. It has been shown in the preceding pages that the addition of iodine will reduce the rate of oxidation of amine solutions. Thus a reaction which would impair the integrity of the amine solution is inhibited. Another and equally undesired reaction is corrosion of the apparatus in which the process is performed.

Aqueous amine solutions used in fluid separating processes are at first quite free of corrosive constituents. But when these solutions are oxidized, ammonia is released, and amino and other organic acids are formed. These organic acids are more or less corrosive to metal apparatus.

Thus far it has not been possible, by the introduction of iodine, to prevent entirely the formation of corrosive substances. In order to counteract the effect of those corrosive substances which are formed to some extent even in the presence of iodine, it is proposed to introduce a substance which will operate directly to protect the metal. Copper has this property, and it can be easily introduced into the amine solution, preferably by adding some readily ionizable salt of copper, such as copper sulphate. Indeed, it is possible to accomplish two important purposes by adding to the aqueous amine solution an inorganic salt of iodine and copper. The result of such an addition is a substantial reduction in the amount of corrosion coupled with a substantial reduction in the degree of oxidation of the solution.

It has been known that corrosion of metallic equipment may be somewhat alleviated by incorporating copper in amine solutions. This is discussed in Patent No. 2,377,966. Although this aspect of the utility of copper has been appreciated heretofore, it has been found that the amount of copper added must be rather carefully controlled. For instance, it has been discovered that in the presence of 500 parts per million of copper a 3 molar aqueous solution of monoethanolamine will lose 1.54 grams of ammonia. (Since ammonia bears a functional relationship to amount of amine oxidized, this is a fair measure of the extent of oxidation of monoethanolamine.) If there were no copper present, 1.75 grams of ammonia would be evolved. On the other hand, if the amount of copper is doubled, the amount of ammonia evolved will be 2.54 grams. Thus it will be seen that the use of more than a very small proportion of copper involves the oxidation of a great deal more of the solution than would be the case if no copper were present.

Apparently when copper and iodine are simultaneously present, the tendency of copper somewhat to increase the rate of oxidation of the amine solution except under carefully controlled conditions, is substantially reduced.

That it should be possible to use copper with iodine in this way is quite a surprising thing because it is well known that copper has a catalytic effect in promoting reactions between organic and inorganic agents. That is to say, that since iodine will react with amine compounds under some conditions (halogen salts of many different amines being known), one would normally expect that the presence of copper would promote this reaction. It would therefore be supposed that bringing an aqueous amine solution into contact with copper or a copper-containing compound in the presence of so active a reagent as iodine would result in decomposition rather than stabilization of the original amine.

Considering the technique of the process in greater detail, it may be said that compounds or mixtures containing copper and iodine are capable of exerting a pronounced stabilizing influence upon any of the types of amines commonly encountered in fluid-separating cycles of the type here under consideration. Specifically, amines used in this way include the ethanolamines both primary, secondary and tertiary, monoisopropanolamine, diaminopropanolamine and other similar amino, or aminohydroxy compounds, preferably containing less than ten carbon atoms. It is of course well known that a wide variety of amines may be utilized in fluid-separating systems, and the naming of the specific examples just given is not to be taken as indicating a restriction or limitation on the scope of the invention. Since no amine useful in the cyclic separation of mixed fluids has thus far been found which is not rendered more resistant to oxidation by treatment with the reagents of this invention, it is intended that the term "amine" when used in this application shall be understood to mean any aqueous amine solution which is commercially useful in cyclic processes for the separation of mixed fluids, whether these fluids be in liquid or gaseous forms.

Insofar as the iodine-supplying constituent is concerned, it has already been indicated that almost any compound capable of introducing iodine ions into an aqueous amine solution is useful in the process. In addition to the iodides and iodates mentioned previously it may be noted that alkaline earth compounds are useful.

Insofar as the copper constituent is concerned, most forms of copper, including the massive metal, may be employed. The only requirement is that the copper itself or the compound of copper, as the case may be, shall be soluble to at least some extent in the fluids of the primary separating process where the cupriferous agent is to be used. Many different copper salts have been employed successfully: the one most conveniently available is cupric sulfate, preferably the pentahydrate form.

As has been suggested above, one very useful and effective addition agent which is capable of performing both of the functions desired is cuprous iodide ($Cu_2I_2$). Reference to Table III will show that this produced a reduction in the rate of oxidation of 82.7%, even though only 0.1% of the agent was added. Corrosion tests to determine the amount of corrosion by such solutions indicate that when copper and iodine are present in similar concentrations—that is, of the order of 0.1%—the extent of corrosion is reduced to zero.

It has been pointed out above that, except in small ranges of concentration, the presence of copper is likely to increase the tendency of amine solutions to oxidation. One important consequence of the introduction of iodine is a reduction in the extent of corrosion, since the introduction of iodine reduces the amount of corrosive by-products formed by oxidation of the amine solution. Consequently, it is economically and chemically possible to use iodine and copper simultaneously, in spite of the fact that copper does, under some circumstances, tend to promote the oxidation of amine solutions. This situation is dramatically presented in the following tables, marked Table IV and Table V, respectively.

Table IV

EFFECT ON CORROSION OF ADDING STABILIZING AGENTS TO 3-MOLAR AQUEOUS SOLUTION OF DIETHANOLAMINE

| Material Added | Percent Added | Per cent Loss in Wgt. of Panel |
|---|---|---|
| None | None | 19.27 |
| KI | 0.1 | 6.12 |
| CuSO$_4$.5H$_2$O | 0.1 (as Cu) | 0.00 |
| KI | 0.1 | |
| CuSO$_4$.5H$_2$O | 0.05 (as Cu) | 0.00 |

Table V

EFFECT ON CORROSION OF ADDING STABILIZING AGENTS TO 3-MOLAR AQUEOUS SOLUTION OF MONOISOPROPANOLAMINE

| Material Added | Percent Added | Per cent Loss in Wgt. of Panel |
|---|---|---|
| None | None | 12.9 |
| KI | 0.25 | 6.6 |
| CuSO$_4$.5H$_2$O | 0.05 (as Cu) | 0.00 |
| KI | 0.25 | |
| CuSO$_4$.5H$_2$O | 0.05 (as Cu) | 0.00 |

In both tables, the demonstration was conducted by immersing a steel panel in the aqueous amine solution identified, at a temperature of 80° C., in contact with a gaseous mixture consisting of 50% O$_2$ and 50% CO$_2$. That is to say, the conditions were parallel to those recited in connection with the previous tables of this specification. In Table IV, the solution used was a 3-molar solution of diethanolamine. In Table V the solution tested was a 3-molar solution of monoisopropanolamine.

It is interesting to note in connection with Tables IV and V, just above, that although the addition of 0.1% of potassium iodide to a diethanolamine solution reduced the rate of corrosion by about two-thirds—that is from 19.27% to 6.12% as a result of the reduction in the quantity of oxidation products formed during the test, the reduction in the rate of oxidation of the amine was not sufficient to entirely eliminate oxidation products and thereby completely prevent the corrosion of the panel. Where copper was added to the solution containing the iodine, corrosion was entirely eliminated. Again, where monoisopropanolamine was tested (Table V) the extent of the corrosion of the panel was reduced as a result of a reduction, due to the addition of iodine, in the concentration of the oxidation products produced during the test, but it was again necessary to add copper to protect the panel against corrosion by those oxidation products which were formed in the presence of iodine.

In short, although iodine greatly reduces the rate of oxidation of the amine solution, something more is needed to ensure protection of the apparatus against corrosion from those products of oxidation which are formed to some extent even in the presence of iodine. The addition of the copper reduces corrosion of the apparatus to zero. The addition of both copper and iodine thereby results in a complete protection of the apparatus against corrosion and a marked reduction in the loss of amine which would otherwise result from oxidation of the amine solution if the iodine were absent. Conversely, since the iodine greatly reduces the amount of corrosive substances formed in the process (by oxidation of the amine solution), the amount of copper necessary to protect the apparatus against these corrosive agents may be correspondingly minimized. Consequently the catalytic effect of copper in promoting oxidation of the amine solution is minimized pro tanto.

It is an important aspect of this invention, however, that the conjoint use of iodine and copper in the amine solution makes it possible to secure substantially complete elimination of corrosion of apparatus while at the same time greatly reducing the amount of oxidation taking place in the amine solution. Curiously enough, no amount of iodine will eliminate corrosion entirely, although the addition of copper in sufficient amounts will do exactly this. Yet the copper is capable of affecting the oxidation rate of an amine solution adversely, and for this reason it is very desirable to limit the proportion of copper which is used. The iodine, through its unexpected capacity to reduce oxidation, contributes to this end.

There seems to be no practical limit to the operative ratio of iodine to the solution being treated. The point of maximum reduction in oxidation is attained, however, at relatively low concentrations, usually less than 2%. It does not seem to be possible to add a sufficient amount of iodine to completely eliminate either oxidation or corrosion.

There is a wide variation in the amounts of copper that can be added to the aqueous solutions of alkaline organic amino compounds to protect the plant equipment from corrosion. The quantity can range from 50 p. p. m. to one chemical equivalent of copper for each two chemical equivalents of amine. However, sufficient protection to the plan equipment can be obtained by keeping the copper content of the amine solution at 500–1000 p. p. m. when expressed as the metal.

The addition of the iodine component may be effected in any convenient way. Experience has indicated that it is probably preferable to dissolve the iodine or the iodine-containing compound in the organic amine solution itself. However, if the compound used is water-soluble it can be first dissolved in water and the amine added to the water. Conversely, it may be dissolved in the amine before the amine is mixed with the water to form the aqueous solution. Copper and compounds of copper which are useful in the process may be dissolved in the same way as the iodine compounds. However, the preferred technique is to dissolve the copper in the form of a salt in the aqueous amine solution.

In general, it may be noted that the efficacy of the agents employed varies somewhat with the nature of the amine solution to which they are added. This is most clearly shown in Table I, where the reduction in rate of oxidation of monoethanolamine solutions is much greater at the lower concentrations of potassium iodide than it is with diethanolamine. With the indications given in this specification, however, an experienced operator will have no difficulty in adjusting the proportion of reagent used until he has attained the most efficient point for continuous operation.

So far as has been determined at this time, the iodine compounds added to aqueous amine solutions in cyclic processes for separating mixed fluids remain in the respective cycles indefinitely, without reduction by reason of precipitation or for any other reason. Similarly, there seems to be no necessity for supplementing the amount of copper initially added to the solutions.

Another general consideration with respect to the nature of the compounds which are added to the solution is this: The constituent which seems to produce the desired effect where iodine or its compounds are employed seems to be the iodine ion, and the proportion employed of any given reagent should be so calculated as to ensure the presence of the desired amount of iodine, regardless of any remaining elements in the compound. Similarly, the effective constituent of the cupriferous reagents is copper, and the amount of reagent added should be determined on the basis of the amount of copper present, calculated as the metal.

It is interesting to note that copper and iodine are close together in the electromotive series, with standard electrode potentials of $-0.344$ for the electrode reaction $\frac{1}{2}Cu = \frac{1}{2}Cu^{++} + e$; $-0.47$ for the electrode reaction $Cu = Cu^+ + e$; and $-0.53$ for the electrode reaction $I^- = \frac{1}{2}I_2 + e$.

Although the amount of amine solution converted by oxidation into inactive or corrosive forms during any single cycle through the process is exceedingly small, still it must be remembered that processes of the type here under consideration are usually operated continuously, twenty-four hours a day, and commonly about three hundred days out of the year. Consequently, the effect of even a small amount of oxidation or corrosion is cumulative, and therefore well worth avoiding. Indeed, the increase in corrosive effect may represent a progression somewhat more than strictly arithmetical. In any case, the addition of very small amounts of stabilizing agents effective to introduce ions containing iodine and copper, will not only greatly reduce deterioration of the amine solution and eliminate corrosion of the apparatus; it will also ensure better plant operation through reducing the need for repairs and shutdowns; will reduce the time and material loss involved in adding fresh amine solution to compensate for oxidized solution; will reduce the power requirements by reducing the amount of inactive or actively harmful constituents which must be handled, and will improve efficiency by maintaining at a high level the activity of the entire body of solution circulated.

I claim:

1. In processes of the type employing an aqueous amine solution to separate mixed gases, the method of reducing the tendency of the amine solution to enter into undesired reactions which consists in incorporating in the amine solution stabilizing material containing Cu and I and capable of ensuring the simultaneous presence in the reaction cycle of copper ions and iodine ions.

2. The process of claim 1 in which the stabilizing material comprises an admixture of an iodine salt and a salt of copper.

3. The process of claim 1 in which the stabilizing material comprises from 0.01% to 1.0% of potassium iodide together with cupric sulfate pentahydrate in quantities to provide from 0.025% to 1.0% of copper computed as metal, in the solution.

4. The process of claim 1 in which the stabilizing material is cuprous iodide.

5. In processes of the type employing an aqueous amine solution to separate mixed gases, the method of reducing the tendency of the amine solution to enter into undesired reactions which consists in adding to the amine solution material containing iodine and capable of ensuring the presence in the reaction cycle of iodine ions.

6. The method of claim 5, in which the amount of stabilizing material is sufficient to introduce the equivalent of from 0.001% of potassium iodide to 2.0% of iodine reckoned as elemental iodine.

7. The method of claim 5, in which the stabilizing material is used in quantities sufficient to add the equivalent of approximately 0.1% of potassium iodide, to the amine solution.

8. A process in accordance with claim 5 characterized in that the amine solution treated is an aqueous solution of an alkylol amine.

9. In the process of separating carbon dioxide from a gaseous mixture containing carbon dioxide, which process includes the step of absorbing the carbon dioxide in an aqueous solution of monoethanolamine, the method of reducing the tendency of the monoethanolamine solution to enter into undesired reactions which consists in adding to said solution material containing iodine and capable of ensuring the presence in the solution of iodine ions.

BRUCE T. ALEXANDER.

REFERENCES CITED

The following references are of record in the file of this patent:

UNITED STATES PATENTS

| Number | Name | Date |
| --- | --- | --- |
| 2,016,956 | Calcott | Oct. 8, 1935 |
| 2,017,976 | Kropp | Oct. 22, 1935 |
| 2,211,837 | Rice et al. | Aug. 20, 1940 |
| 2,377,966 | Reed | June 12, 1945 |

OTHER REFERENCES

Hieber et al., "Anorg. Allgem. Chem.," vol. 219, pp. 225—237, 1934.

Richter, "Textbook of Org. Chem.," pp. 235, John Wiley and Sons, Inc., N. Y., 1938.

Babor and Lehrman, "Gen. College Chem.," pp. 554, Thomas Y. Crowell Co., N. Y., 1940.